United States Patent
Lill

(10) Patent No.: US 6,369,703 B1
(45) Date of Patent: Apr. 9, 2002

(54) TIRE PRESSURE MONITOR AND LOCATION IDENTIFICATION SYSTEM

(75) Inventor: Thomas M. Lill, Port Huron, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/607,302

(22) Filed: Jun. 30, 2000

(51) Int. Cl.⁷ .............................................. B60C 23/00
(52) U.S. Cl. ...................... 340/447; 340/442; 340/445; 73/146.2
(58) Field of Search ................................. 340/442, 445, 340/447; 73/146.5, 146.2, 146.4

(56) References Cited

U.S. PATENT DOCUMENTS

| | | | |
|---|---|---|---|
| 5,483,827 A | * 1/1996 | Kulka et al. ................ | 73/146.5 |
| 5,540,092 A | * 7/1996 | Handfield et al. .......... | 73/146.5 |
| 5,585,554 A | * 12/1996 | Handfield et al. .......... | 73/146.5 |
| 5,731,754 A | * 3/1998 | Lee, Jr. et al. .............. | 340/447 |
| 6,087,930 A | * 7/2000 | Kulka et al. ................ | 340/447 |

\* cited by examiner

*Primary Examiner*—Edward Lefkowitz

(57) ABSTRACT

A system for monitoring and tire pressure in vehicles and correlating the specific locations of the vehicle tires with the tire pressure data of each tire. The system includes a tire pressure monitor operatively connected to each tire. A plurality of transponders, each having a unique identification code, are fixed to the vehicle such that there is one transponder secured proximate to a predetermined tire. During operation, each tire pressure monitor transmits tire pressure data to its corresponding transponder. The transponder adds its unique location identification code to the tire pressure data and transmits the data to a central system receiver. The central system receiver selectively displays the tire pressure data by tire location.

20 Claims, 2 Drawing Sheets

TIRE PRESSURE MONITOR AND LOCATION IDENTIFICATION SYSTEM

FIELD OF THE INVENTION

This invention relates to a system for monitoring tire pressure in wheeled vehicles. More specifically, the invention is directed to a remote tire pressure monitoring system that monitors the tire pressure for each tire and indicates to the vehicle operator the unique location of each tire being monitored.

BACKGROUND OF THE INVENTION

It is known to equip vehicle tires with mechanisms to indicate tire pressure. For example, it is known to include tire pressure sensors that communicate the tire pressure information to a vehicle operator via tuned circuits and radio transmitters. The tire pressure sensors are mounted within the tire air valve stem and transmit pressure readings at predetermined time intervals using radio frequency, directly to a centralized tire pressure monitoring receiver. However, such known tire pressure monitoring systems lack a mechanism for reporting pressure information for specific vehicle tires. Accordingly, when the tire pressure sensors communicate that tire pressure is low, the vehicle operator has to manually determine which specific vehicle tire or tires have low pressure (for example, the right front tire or the spare tire, etc.).

To aid in specific vehicle tire location identification, other tire pressure monitoring systems have been employed that include coding each of the tires with unique digital values to provide an identification code. However, there are drawbacks associated with coding the tires. One such drawback includes the need to re-code each of the tires when routine maintenance activities are employed, such as tire rotation or replacement. Because tire rotation places the vehicle tires in random locations, the service person in charge of rotating the tires must re-code to insure correct identification of the tires.

Another known tire pressure monitoring system includes using remotely located antennae that have a limited reception capability. The antennae are connected by coaxial cables to a centralized tire pressure monitoring receiver, and thus, the location of a particular tire pressure signal may be determined. However, use of coaxial cable is expensive, as it requires an excessive length to enable the cable to be strung throughout the vehicle to the various antennae.

Thus, there is a need for an improved tire pressure monitoring system that identifies the specific locations of the vehicle tires without requiring re-coding or the use of extensive coaxial cable to transmit data.

SUMMARY OF THE INVENTION

The present invention is directed to a tire pressure monitoring and identification system. The system includes a plurality of tire pressure monitors that transmit tire pressure information to a plurality of corresponding transponders. The transponders each have a unique identification code and transmits both the tire pressure data received from the tire pressure monitors and the identification code of the transponders to a central system receiver. The central system receiver provides the tire pressure data and location identification for each tire to a vehicle operator.

In accordance with one aspect of the invention, for every tire, at least one transponder is secured to the vehicle body proximate to the tire from which it is to receive tire pressure readings. The transponders each have a limited predetermined signal range, such that each transponder only receives tire pressure data from the proximately located tire pressure monitor. Further, each transponder is provided with a unique identification code that corresponds to where the tire is mounted on the vehicle.

During operation of the system, the tire pressure monitor collects tire pressure data from the vehicle tire and transmits the data to the transponder. Typically, the tire pressure monitor transmits the tire pressure data to its corresponding transponder via radio frequency. However, the tire pressure monitor may also transmit the tire pressure data via an inductive, ultrasonic, infrared or other suitable signal. In accordance with the invention, each transponder only receives tire pressure data from the closest tire pressure monitor. The transponder then adds its unique location identification code to the tire pressure data and re-transmits the data to the central system receiver. Thus, the central system receiver correlates the tire pressure data to a particular tire location. Because the transponders are secured to the vehicle, instead of to the tires, there is no need to reprogram the system to identify specific tire locations if the tires are removed or rotated. Further the use of radio frequency, inductive, ultrasonic and infrared signals eliminates the need for expensive coaxial cables.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF THE PREFERRED EMBODIMENT

Figure 1:
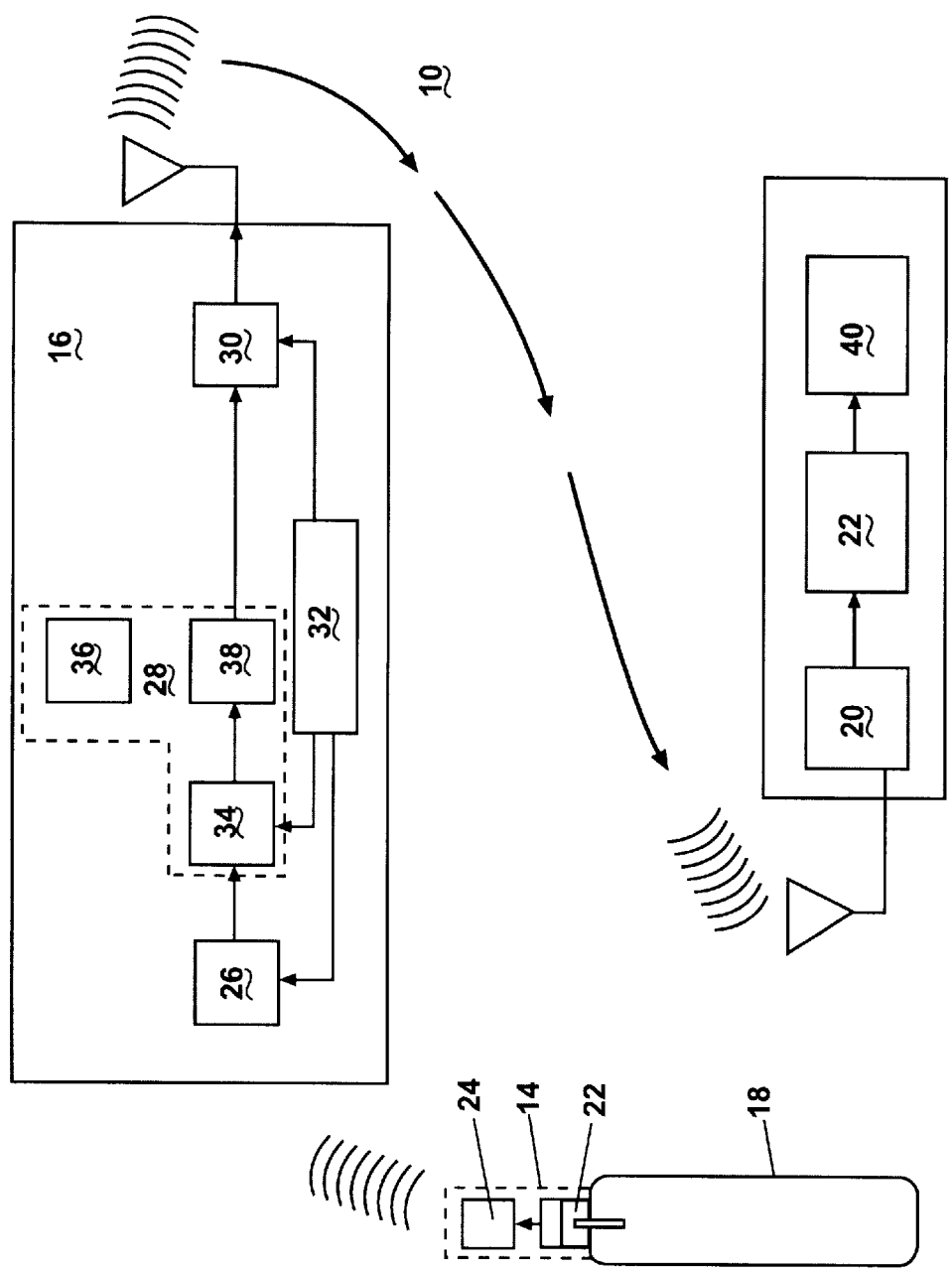
FIG. 1 is a block diagram of a tire pressure monitor and identification system in accordance with the present invention.
Figure 2:
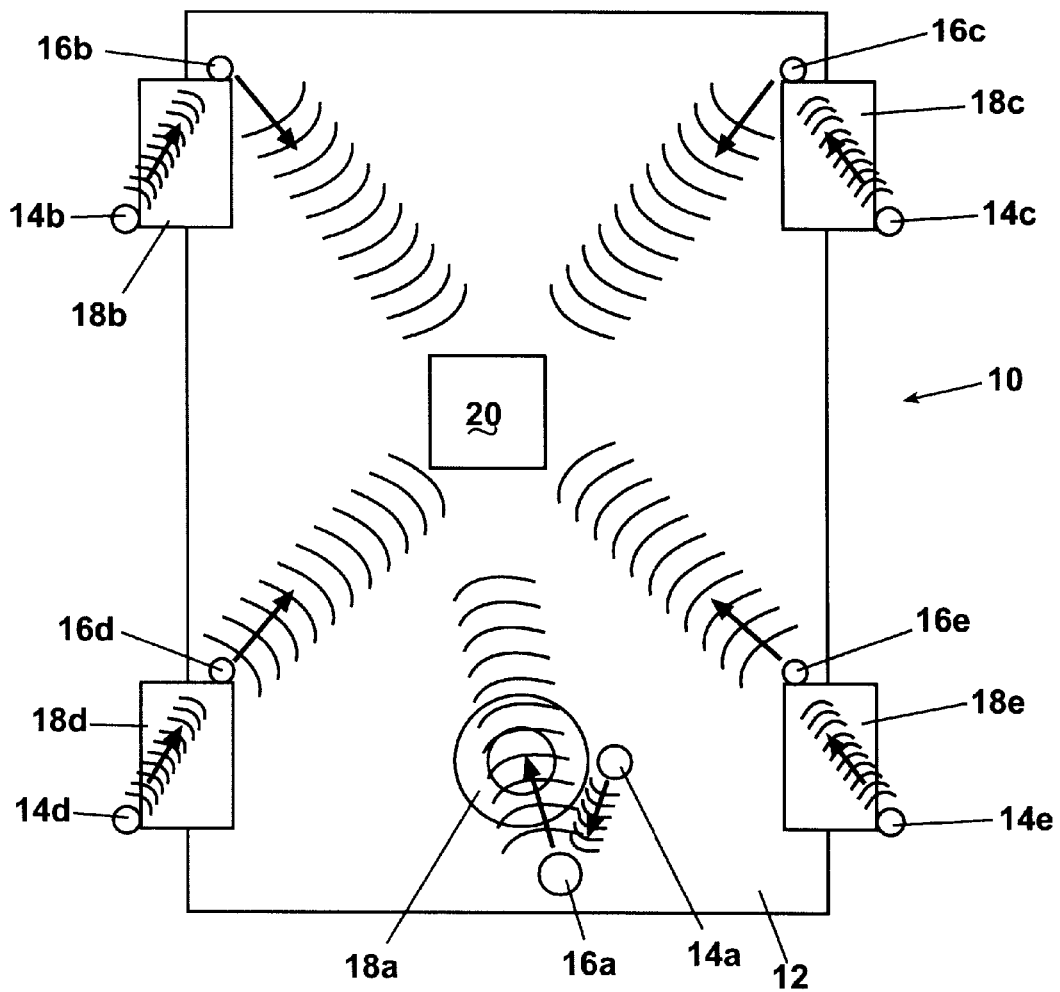
FIG. 2 is a schematic of the tire pressure monitor and identification system installed on a vehicle.

Referring to FIGS. 1 and 2, a tire pressure monitor and identification system 10 for a vehicle 12 is shown. System 10 includes at least one tire pressure monitor 14 and at least one transponder 16 associated with each tire 18 (preferably including the spare tire 18a) and a central system receiver 20 that communicates both pressure and location readings for each tire 18.

Tire pressure monitor 14, as best seen in FIG. 1, includes a standard tire pressure sensor 22 connected in series with a tire pressure data transmitter 24. At least one tire pressure monitor 14 is mounted in each vehicle tire 18. Typically, tire pressure monitors 14 are mounted within the air valve stem (not shown) of the vehicle tire 18. In operation, sensor 22 collects data regarding tire pressure for the specific tire 18 to which it is mounted. Transmitter 24 then transmits the data to a receiver, to be explained in further detail below, preferably via radio frequency such that there is no need for coaxial cables. Alternatively, the data could be transmitted from transmitter 24 to a receiver using an inductive (or magnetic), ultrasonic, or infra-red signals.

Unlike the prior art where tire pressure data is transmitted directly to a central monitoring system receiver, each pressure monitor 14 transmits pressure data to a specific transponder 16. Each transponder 16, as best seen in FIG. 1, includes a localized tire pressure monitor signal receiver 26, a microprocessor 28, and a transponder transmitter 30. All components of each transponder 16 are preferably contained in a small housing, for ease of mounting and to reduce the likelihood of contaminants impairing the operation of transponders 16. When receiver 26 is adapted to receive a radio frequency signal, it typically includes its own antenna. Each transponder 16 preferably further includes an independent power supply 32 so as to be totally self-contained, and eliminates the need for any power cabling or coaxial cables to operate. Preferably, power supply 32 is a long life battery. Alternatively, transponders 16 may be powered by the battery system of the vehicle 12.

In accordance with the invention, there is at least a single transponder 16 associated with each vehicle tire 18. Each transponder 16 is mounted directly to the vehicle 12, proximate a vehicle tire 18, such that the transponder 16 receives pressure data from a single tire 12. For example, transponders 16 may be mounted to the wheel well, the frame of vehicle 12, or the axle of the vehicle tire 18. For the spare tire 18a, transponder 16 is mounted in the trunk, adjacent to spare tire 18a. Preferably, transponders 16 are permanently connected to vehicle 12 during manufacture of the vehicle, such that transponders 16 are not intentionally or accidentally relocated. However, the invention contemplates aftermarket installation of system 10 such that transponders 16 may be bolted onto vehicle 12, or the like.

Each transponder 16 is further equipped with a predetermined and unique location identification code that signifies where the transponder 16 is mounted on vehicle 12. For example, for a system 10 having five transponders 16a, 16b, 16c, 16d, and 16e, the identification codes may be as follows: spare tire 18a-000; left front vehicle tire 18b-001; right front vehicle tire 18c-010; left rear vehicle tire 18d-011; right rear vehicle tire 18e-100.

Further, in accordance with the invention, each transponder 16 has a limited predetermined signal receiving area, such that each transponder 16 may only receive pressure data from the nearest tire pressure monitor 14. For example, transponder 16b only receives tire pressure data from tire pressure monitor 14b mounted in vehicle tire 18b.

The operation of transponders 16 is as follows. Localized receiver 26 receives a signal from the nearest tire pressure monitor 14. When each receiver 26 has its own antenna for receiving a radio frequency signal, the antenna can be configured to further isolate the signal from the nearest tire pressure monitor 14. Localized receiver 26 is preferably a radio frequency receiver, although inductive, ultrasonic or other suitable receivers may be employed. Next, localized receiver 26 transmits pressure information to microprocessor 28, where the tire pressure data 34 is stored at predetermined time intervals. The location identification code for each transponder 16 is stored in the memory 36 of microprocessor 28.

The tire pressure data is added to the location identification code 38 and then transmitted, at predetermined time intervals, to central system receiver 20. Suitable transponders 16 for this operation operate at approximately 315–350 megahertz. The tire pressure data and location identification code is preferably transmitted by a radio frequency transmitter 30, or other suitable transmitter, to central system receiver 20. For battery-operated transponders 16, it is preferred that transponder 16 is further programmed to transmit a low voltage signal to central system receiver 20 when the battery voltage drops below a predetermined value.

Central system receiver 20 is connected to a microprocessor 22 that receives the tire pressure and location identification code of each vehicle tire 18. Microprocessor 22 maybe connected to a display 40 within the vehicle 12 to indicate to a vehicle operator the tire pressure of each vehicle tire 18. Alternatively, microprocessor 22 may be connected to an indicator that informs the vehicle operator of a low pressure and a location reading of individual vehicle tires 18 when that vehicle tire drops beneath a predetermined pressure value.

For tire pressure monitors 14 that transmit tire pressure data to respective transponders 16 using radio frequency, it is recognized that some signals may be strong enough to reach central system receiver 20, as well as transponders 16. In such instances, central system receiver 20 may be programmed such that radio frequency data signals from tire pressure monitors 14 are ignored. Alternatively, the tire pressure monitor 14 radio frequency signal may be used as a check, to verify the operation of transponders 16.

To avoid radio frequency signals from tire pressure monitors 14 from reaching central system receiver 20, as stated above, tire pressure monitors 14 may use alternative signals, such as an inductive (or magnetic) signal, ultrasonic signal, or an infrared signal. For example, tire pressure monitors 14 may use an inductive signal to send tire pressure data from the vehicle tire 18b to it corresponding transponder 16b. Transponder 16b would receive the inductive tire pressure data signal, store it in microprocessor 28, then re-transmit the tire pressure data, with the location identification data, over a radio frequency link to central system receiver 20.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A tire pressure monitor and identification system for a vehicle, comprising:
   at least one tire pressure monitor operatively connected to a vehicle tire; said tire pressure monitor adapted to collect tire pressure data for said vehicle tire;
   at least one transponder connected to said vehicle, said transponder having a location identification code, said transponder adapted to receive said tire pressure data from said tire pressure monitor; and
   a central system receiver for receiving said tire pressure data for said vehicle tire and said location identification code from said transponder, wherein said central system receiver is adapted to selectively provide said pressure data and a location identification indication of said tire to a vehicle operator.

2. The tire pressure monitor and identification system of claim 1, wherein said tire pressure monitor is mounted to said vehicle tire.

3. The tire pressure monitor and identification system of claim 2, wherein said tire pressure monitor is mounted in said air valve stem of said vehicle tire.

4. The tire pressure monitor and identification system of claim 1, wherein said transponder is mounted to the vehicle, proximate to said vehicle tire.

5. The tire pressure monitor and identification system of claim 4, wherein said transponder is permanently secured to the vehicle.

6. The tire pressure monitor and identification system of claim 1, wherein said tire pressure data is transmitted from said tire pressure monitor by one of a radio frequency signal, inductive signal, ultrasonic signal and infrared signal.

7. The tire pressure monitor and identification system of claim 1, wherein said transponder transmits said tire pressure data and said location identification code to said central system receiver via radio frequency.

8. The tire pressure monitor and identification system of claim 1, wherein said central system receiver is connected to a display to provide to a vehicle operator said tire pressure data for said vehicle tire and a location identification of said vehicle tire.

9. The tire pressure monitor and identification system of claim 8, wherein said central system receiver indicates said tire pressure data and location identification of said vehicle data when said tire pressure drops beneath a predetermined pressure.

10. The tire pressure monitor and identification system of claim 1, wherein said central system receiver is programmed to ignore radio frequency signals received from said tire pressure monitor.

11. The tire pressure monitor and identification system of claim 1, wherein said transponder is powered by a battery.

12. The tire pressure monitor and identification system of claim 11, wherein said transponder transmits a low voltage signal to said central system receiver when the voltage of said battery drop beneath a predetermined value.

13. A tire pressure monitor and identification system for a vehicle, comprising:
- at least one tire pressure monitor operatively connected to each vehicle tire; each of said tire pressure monitors adapted to collect tire pressure data for each corresponding vehicle tire;
- a plurality of transponders connected to said vehicle such that at least one transponder is positioned proximate to each vehicle tire;
- wherein each of said transponders has a unique location identification code;
- wherein each of said transponders receives said tire pressure data from a unique tire pressure monitor; and
- a central system receiver for receiving said tire pressure data for said vehicle tire and said location identification code from said transponders, wherein said central system receiver selectively provides said tire pressure data and a location identification of each of said tires to a vehicle operator.

14. The tire pressure monitor and identification system of claim 13, wherein each of said transponders has a predetermined limited signal receiving area such that each of said transponders may only receive tire pressure data from the closest positioned tire pressure monitor.

15. The tire pressure monitor and identification system of claim 13, wherein each of said transponders are powered by individual batteries.

16. The tire pressure monitor and identification system of claim 15, wherein said transponders transmit a low voltage signal to said central system receiver when the voltage of said batteries drop beneath a predetermined value.

17. The tire pressure monitor and identification system of claim 16, wherein said transponders transmit said tire pressure data, location identification codes and battery voltage information to said central system receiver via radio frequency.

18. The tire pressure monitor and identification system of claim 13, wherein said tire pressure data is transmitted from said tire pressure monitors via radio frequency.

19. The tire pressure monitor and identification system of claim 18, wherein said central system receiver is programmed to ignore radio frequency signals received from said tire pressure monitor.

20. The tire pressure monitor and identification system of claim 18, wherein said central system receiver compares radio frequency signals received from respective tire pressure monitors to radio frequency signals received from corresponding transponders to insure operability of said system.

* * * * *